Figure 1:
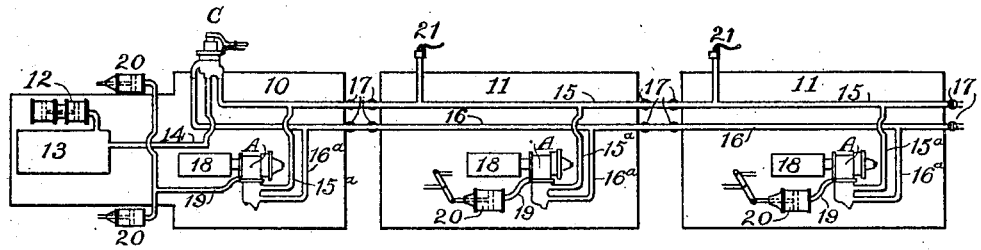

A. I. PERRY.
AIR BRAKE SYSTEM.
APPLICATION FILED MAY 17, 1907.

913,972.

Patented Mar. 2, 1909.
5 SHEETS—SHEET 1.

Witnesses:

Inventor:
Arthur Irving Perry

A. I. PERRY.
AIR BRAKE SYSTEM.
APPLICATION FILED MAY 17, 1907.

913,972.

Patented Mar. 2, 1909.
5 SHEETS—SHEET 2.

Witnesses:
Holton Duncan Robinson
Robert Edward Hawley

Inventor:
Arthur Irving Perry

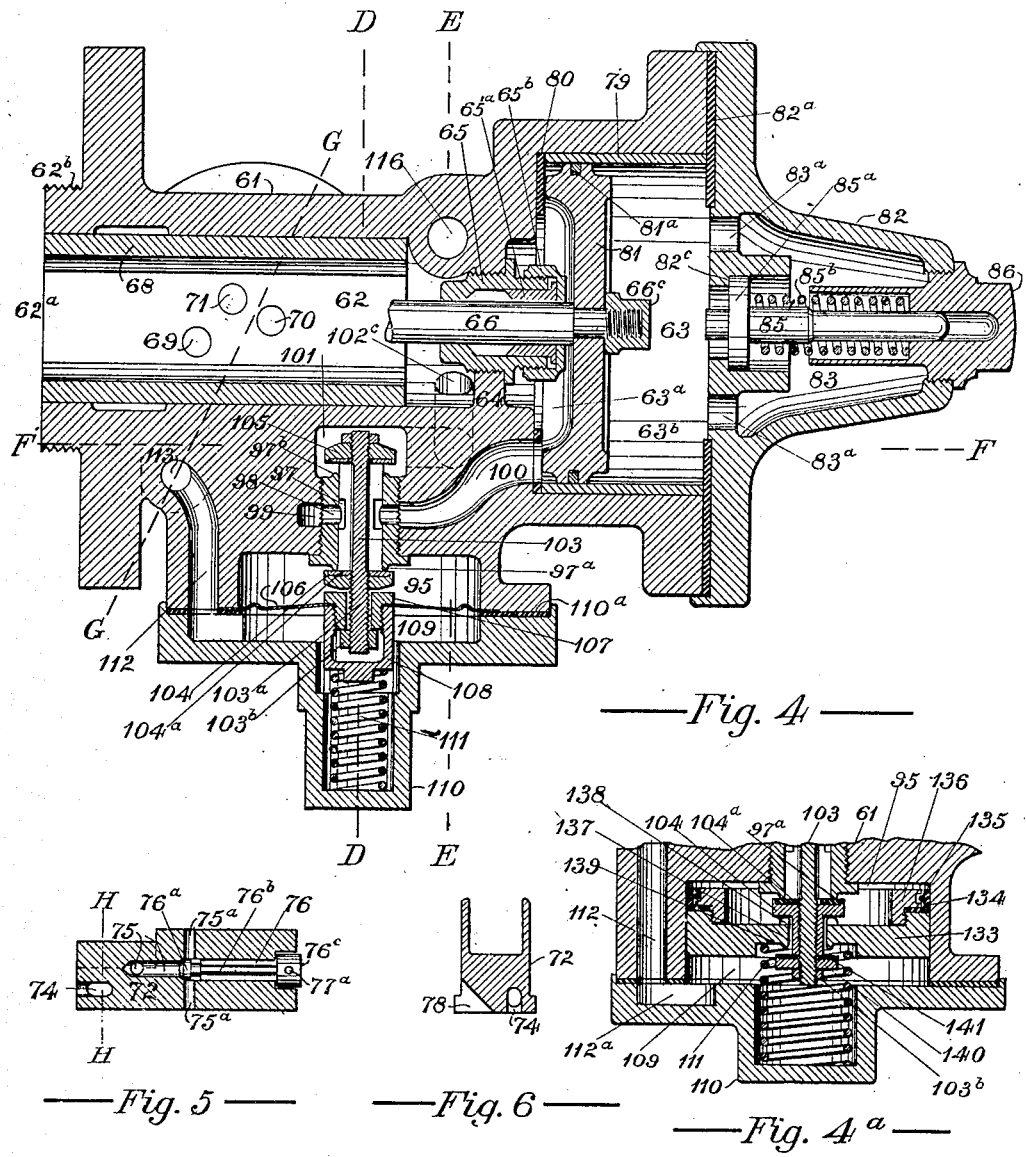

A. I. PERRY.
AIR BRAKE SYSTEM.
APPLICATION FILED MAY 17, 1907.

913,972.

Patented Mar. 2, 1909.
5 SHEETS—SHEET 4.

Witnesses:
Holton Duncan Robinson
Robert Edward Hawley

Inventor:
Arthur Irving Perry

A. I. PERRY.
AIR BRAKE SYSTEM.
APPLICATION FILED MAY 17, 1907.

913,972.

Patented Mar. 2, 1909.
5 SHEETS—SHEET 5.

Witnesses:
Holton Duncan Robinson
Robert Edward Hawley

Inventor:
Arthur Irving Perry

UNITED STATES PATENT OFFICE.

ARTHUR IRVING PERRY, OF NEW YORK, N. Y.

AIR-BRAKE SYSTEM.

No. 913,972.   Specification of Letters Patent.   Patented March 2, 1909.

Application filed May 17, 1907. Serial No. 374,227.

*To all whom it may concern:*

Be it known that I, ARTHUR IRVING PERRY, a citizen of the United States, and a resident of the city of New York, borough of Brooklyn, in the county of Kings and State of New York, have invented a new and Improved Air-Brake System, of which the following is a full, clear, and exact description.

My invention relates to air-brake systems and more particularly to those in which the braking action is to be effective throughout a train consisting of a plurality of cars; also to improvements in the valves and operation of the air-brake system which is the subject of my Letters Patent of May 29, 1906, No. 822,073. Its principal objects are to combine into one system all the advantages of the so called "automatic quick action system" and the "straight air system" without the disadvantages of either of them; that is, (1) to provide means for simultaneously applying the brakes with a definite and controllable pressure; (2) for maintaining said pressure any desired length of time, without releasing the brakes or diminishing their pressure; (3) for maintaining uniform pressures in brake cylinders throughout train, independent of the travel of pistons; (4) for maintaining at all times, full working pressure in the auxiliary-reservoirs; (5) for quick action emergency application of brakes throughout train either at the will of operator of train, or by opening a "conductor's valve" on any car; (6) for automatic application or automatic quick action application of brakes throughout train, upon the parting of train, bursting of supply pipe (train pipe) or other accident causing a reduction of pressure in supply pipe; (7) for automatic or automatic quick action application of brakes throughout train upon the bursting or other accident to controlling pipe, when the controlling valve (engineer's valve) is set to maintain pressure in the controlling pipe; also (8) for converting the action of the valves so that they may be used the same as, or in connection with, the valves of the present standard air-brake systems, if desired.

Reference is to be had to the accompanying drawings, forming a part of this specification, in which similar characters of reference indicate corresponding parts in all the views.

References made in this specification to the "right" or to the "left" refer respectively to the right or left as indicated on the drawings and not to the position of the mechanism. In the same manner references made to the "top" or "up", refer to the top of drawings and to the "bottom" or "down" to the bottom of drawings.

Figure 2:
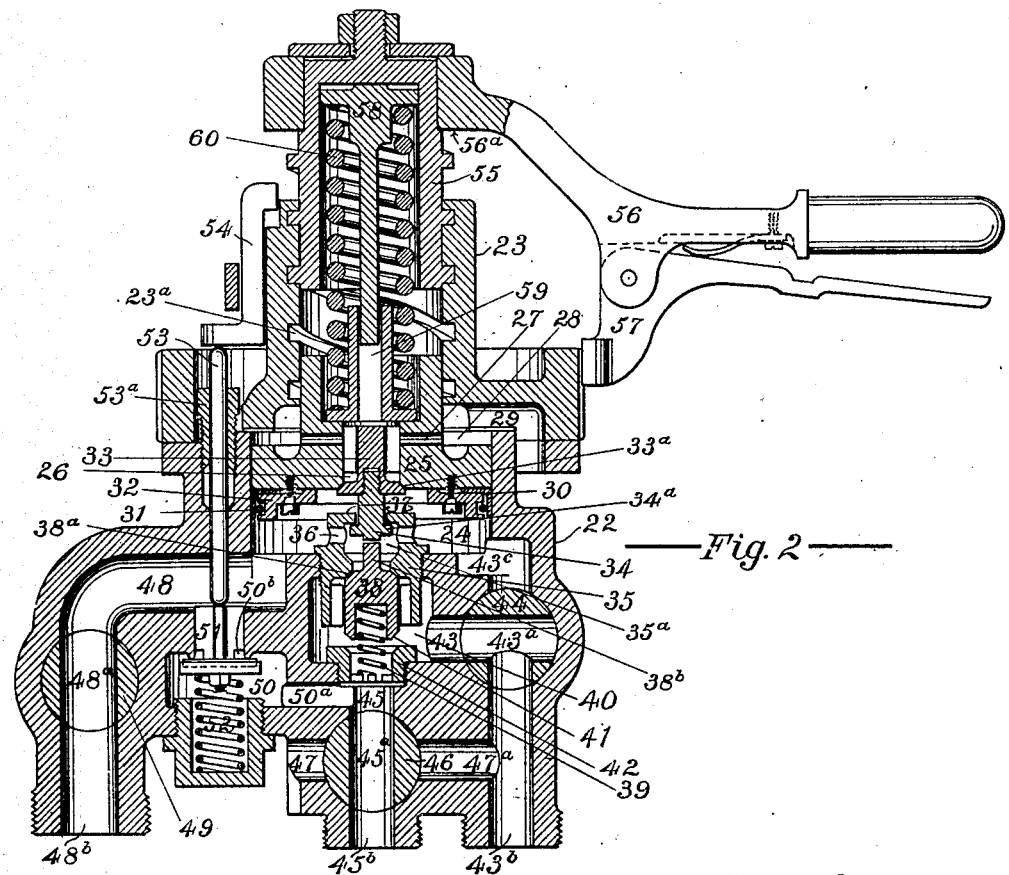
Figure 3:
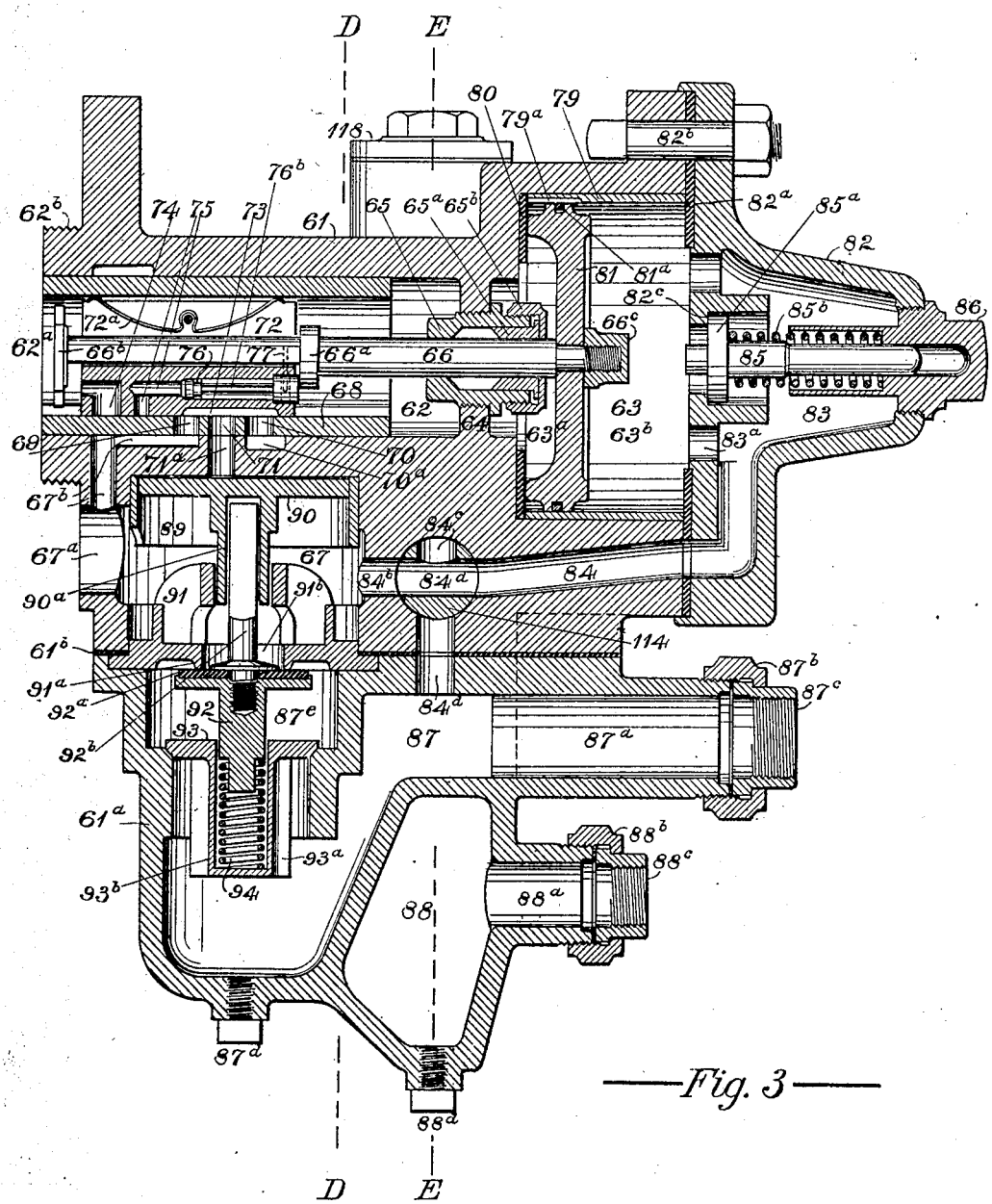
Figure 7:
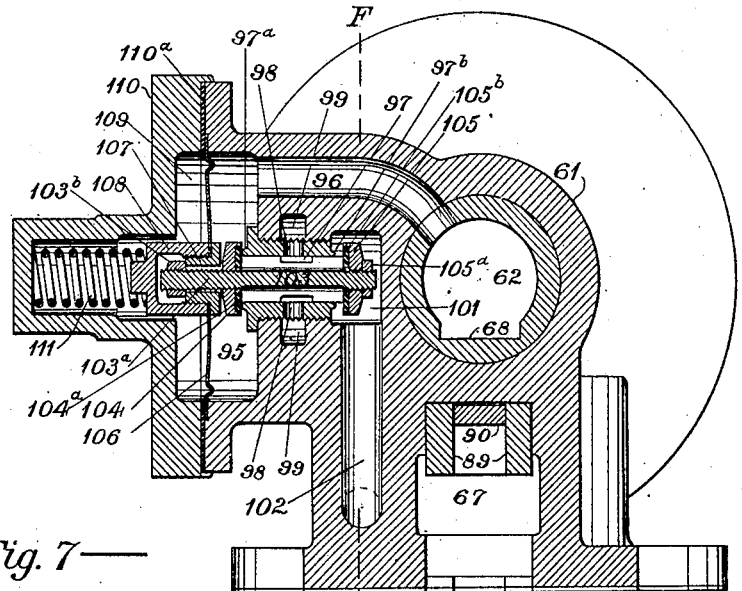
Figure 8:
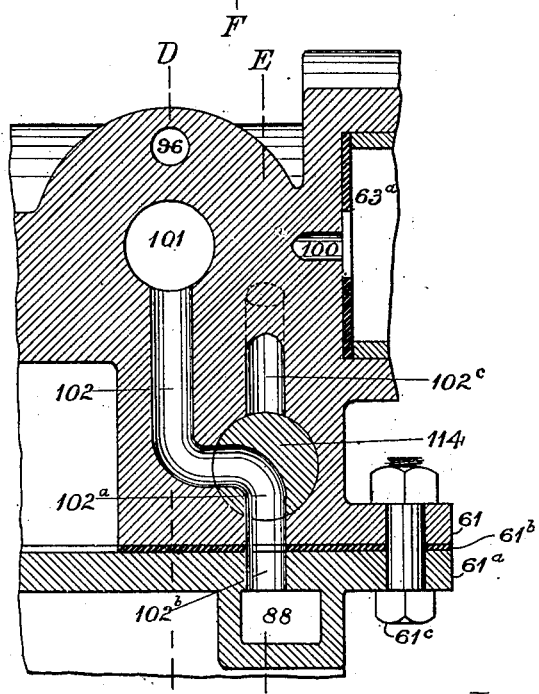
Figures 9, 10, 11, 12:
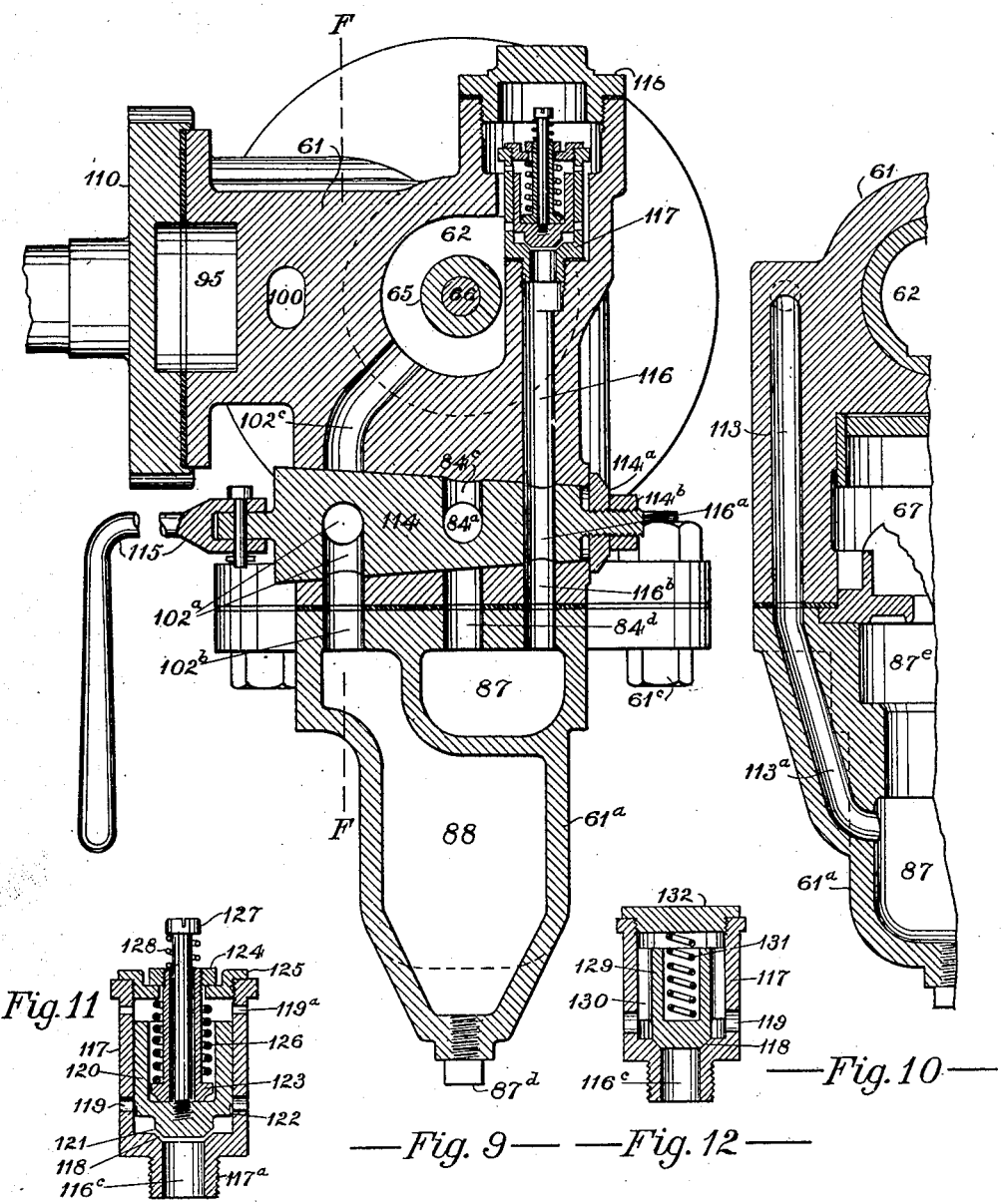

Figure 1 is a diagrammatic view of a train having my invention applied thereto; Fig. 2 is a vertical section through the controlling valve ("engineer's valve"); Fig. 3 is a vertical longitudinal section through the auxiliary controlling valve ("triple valve"); Fig. 4 is a horizontal section through the auxiliary valve, at the center of piston; Fig. 4ª is a horizontal section, showing an alternative design, for the automatic valve with diaphragm, shown in Fig. 4; Fig. 5 is a horizontal section, through the slide valve, and Fig. 6 is a vertical section through the same at the point indicated by the line H—H; Fig. 7 is a part vertical cross section of the auxiliary valve at the point indicated by the line D—D; Fig. 8 is a part vertical longitudinal section through the auxiliary valve at the point indicated by the line F—F; Fig. 9 is a vertical cross section of the auxiliary valve at the point indicated by the line E—E; Fig. 10 is a part vertical diagonal section of the auxiliary valve at the point indicated by the line G—G; Fig. 11 is an enlarged vertical cross section of the check valve shown in Fig. 9, and Fig. 12 shows a section of an ordinary check valve as an alternative to that shown in Fig. 11.

I have here illustrated three cars (designated in Fig. 1 as 10, 11 and 11), the first of which represents the locomotive or motor car, equipped with operating mechanism for the brakes and the other two represent freight or passenger cars of a train.

Mounted upon the motor car is a compressor 12, adapted to maintain in the system a substantially uniform pressure and which is connected to the main reservoir 13. The car also carries a manually controlled primary controlling valve ("engineer's valve") C, which is connected to the main reservoir 13 by the pipe 14.

Connected with the controlling valve C and running throughout the length of train is a supply pipe (train pipe) 15, the sections of pipe on each car being connected together with suitable hose connections; also connected with the controlling valve C and running throughout the length of train, is a controlling pipe 16, the sections of this pipe on each car being also connected together with suitable hose connections. The ends of both supply and controlling pipes on each car are fitted with suitable angle cocks, 17, those between the cars being open and those at the end of train being closed.

Mounted upon each car is an auxiliary controlling valve A which is connected to the supply pipe 15 by the pipe $15^a$, and to the controlling pipe 16 by the pipe $16^a$. These pipes $15^a$ and $16^a$ may be fitted with cocks, to permit any auxiliary valve to be cut out from the rest of train.

The auxiliary valve A on each car is also connected with an auxiliary reservoir 18 and by suitable means such as a pipe 19, to a brake cylinder, (or cylinders) 20. Associated with the brake cylinder, (or cylinders) 20 is the usual brake mechanism for co-operation with the car wheels.

Upon each car and connected with the supply pipe 15 may be placed an emergency or "conductor's" valve 21, to permit the escape of pressure from the supply pipe 15 and therefore apply the brakes.

The controlling valve C is shown in section in Fig. 1, and consists of two valve casings 22 and 23 securely fastened together. In the valve casing 22 is a preferably cylindrical space 24 fitted with a movable piston 25, through which is a preferably cylindrical opening or space 26, connected by openings 27 to the space 28, which is connected by the passage 29 to the atmosphere. The piston 25 is packed by suitable means against leakage, here shown as a leather washer 30 with a spring 31 pressing outward, both being held by the ring 32 securely fastened to the piston 25.

Fitted into the space 26 is a movable check valve 33, which when seated on its seat $33^a$ closes communication between the spaces 24 and 26. Securely attached to 33 is a rod, 34, fitted at one end with projections $34^a$.

Within the valve casing 22 is a space 40 connected by the passages 43, $43^a$ and $43^b$ with the supply pipe 15. In the valve casing 22 is also fitted a valve 44 with the passage $43^a$, so that by turning 44, the communication of $43^b$ with 43 is closed and communication is established between passage $43^b$ and the passage $43^c$ which connects with the space 24.

Between the spaces 24 and 40 is a check valve casing 35 securely fastened to the valve casing 22, and containing a check valve seat $38^a$ also spaces $35^a$ and 36, which allows communication between 24 and 40. It also contains projections 37 which when bearing against the projections $34^a$, limit the upward motion of the check valve 33.

Within the check valve casing 35 is fitted a double seated check valve 38, one seat of which is normally held against its seat $38^a$ by the spring 39 and which closes communication between the spaces 24 and 40. The check valve has a projecting rod $38^b$ which is slightly clear of the rod 34, when the projections $34^a$ and 37 are in bearing. The other end of the check valve 38 has a seat 41 which fits a corresponding seat 42, and when check valve 38 is forced down, closes communication between the space 40 and the passages 45, $45^a$ and $45^b$, of which the latter is connected by the pipe 14 to the main reservoir 13.

Between the passages 45 and $45^b$ is a valve 46 containing a passage $45^a$. When the valve 46 is turned $90°$ from the position shown, communication is established between the passage $43^b$ and the atmosphere, through the passages $47^a$, $45^a$ and 47, and communication is closed between the passages 45 and $45^b$.

The space 24 is connected by the passages 48, $48^a$ and $48^b$, with the controlling pipe 16. Between the passages 48 and $48^b$ is a valve 49 containing the passage $48^a$. When the valve 49 is turned $90°$ from the position shown, the communication between 48 and $48^b$ is closed.

Within the casing 22 is a space 50 connected by the passage $50^a$ with the passage 45, and by the passage $50^b$ with the passage 48. Within the passage $50^b$ is a movable check valve 51 which is held against its seat by the spring 52 and normally closes communication between the space 50 and the passage 48. A rod 53 passing through a suitable stuffing box $53^a$, serves to move the check valve 51 from its seat. The rod 53 is operated by the plunger 54.

In order to maintain any desired pressure on the piston 25, the valve casing 23 is fitted with screw threads $23^a$ into which fit the threads of a screw plug 55. The screw plug 55 is rotated by a suitable handle 56 fitted with suitable means 57 for holding it in any desired position. Within the screw plug 55 and the piston 25, are two movable plungers 58 and 59, between which is a spring 60. The plungers 58 and 59 are so constructed that they are free to move vertically but will not rotate horizontally with reference to each other, and will therefore prevent the coiling of the spring 60 through the friction between 55 and 58.

The auxiliary controlling valve shown in Figs 3 to 12 inclusive, consists of two main valve casings 61 and $61^a$ with a rubber gasket $61^b$ between to prevent leakage, and securely fastened together by bolts $61^c$. Within the valve casing 61 are two preferably cylindrical spaces 62 and 63 separated by a wall 64, one end $62^a$ of the space 62 being connected by suitable means, such as the screw $62^b$ with the auxiliary reservoir. In the wall 64 is fitted a suitable stuffing box 65, $65^a$, $65^b$ to prevent leakage, through which passes a piston rod 66, containing projections $66^a$ and $66^b$.

Within the valve casing 61 is another preferably cylindrical space 67, connected by the passage $67^a$ with the brake cylinder and communicating with the passage $67^b$.

Within the space 62 is fitted tightly a slide-valve seat and liner 68, containing an opening or port 69, communicating with the passage $67^b$; also an opening or port 70 communicating with the atmosphere through the passage $70^a$; also an opening or port 71 communicating by the passage $71^a$ with the upper part of the space 67.

On the slide-valve seat 68 is closely fitted a movable slide-valve 72, normally held against its seat by the spring $72^a$. In the lower part of the slide-valve 72, is a space 73, so arranged that when the slide-valve 72 is at the left end of its stroke, as shown, the space 73 establishes communication between the port 69 and 70 and also between 71 and 70. When the slide-valve 72 is about at the center of its stroke, and from this position to the end of its stroke at the right, the space 73 communicates only with the port 70. In the slide-valve 72 is a port or opening 74, which establishes communication between the space 62 and the port 69, when the slide-valve 72 is at the right end of its stroke. The slide-valve 72 also contains a passage 75 and side passages $75^a$ (Fig. 5), which establishes communication between the port 69 and the space 62, when the slide-valve 72 is at about the center of its stroke.

Fitting into a preferably cylindrical space 76 is a check valve with a long fluted stem $76^b$, (for convenience called a "graduating valve") with a valve seat $76^a$ at one end, which normally closes communication between passages 75 and $75^a$; and at the other end an enlarged head $76^c$ containing a small space $77^a$ into which loosely fits a pin 77. The pin 77 is securely fastened to the piston rod 66.

One side of the slide-valve 72 is partly cut away as shown in Fig. 6, leaving the space 78. This space 78 is so arranged that, when the slide-valve 72 is at the end of its stroke to the right, the port 71 will have direct communication with the space 62.

The space 63 is fitted with a liner 79 at one end of which is a rubber gasket or cushion 80. A movable piston 81 which may be fitted with suitable packing $81^a$, is fitted in the lining 79, dividing the space 63 into two parts $63^a$ and $63^b$ and securely attached to the piston rod 66 by the nut $66^c$. A groove $79^a$ is cut into the lining 79 so that when piston 81 is at the left of its stroke as shown, communication is established between the spaces $63^a$ and $63^b$.

The end of the space $63^b$ is closed by a cylinder head 82, with a rubber gasket $82^a$ between it and the main casing 61, the two parts 61 and 82 being held together by bolts $82^b$. In the head 82 is a space 83 communicating by openings $83^a$ with the space $63^b$ and also communicating by the passages 84, $84^a$ and $84^b$ with the space 67. The head 82 also contains a plunger 85, with a projection $85^a$ which bearing against the projection $82^c$ limits the motion of the plunger 85 to the left. A spring $85^b$ acting against the plunger 85, and reacting against the plug 86 which also guides the plunger 85, holds the plunger against the projection $82^c$.

The lower valve casing $61^a$ contains a space 87, which is connected by the passage $87^a$ and by suitable couplings $87^b$, $87^c$ to the supply pipe (train pipe) $15^a$. A small screw $87^d$ serves to drain the space 87 of water due to condensation. The lower valve casing $61^a$ also contains a space 88 connected by the passage $88^a$ and by suitable couplings $88^b$, $88^c$ to the controlling pipe $16^a$. A small screw $88^d$ serves to drain the space 88 of water due to condensation.

The space 67 is fitted with a liner 89 into which is fitted a movable piston 90 with a hollow stem $90^a$. Between the space 67 and a space $87^e$ which is substantially a part of the space 87, is fitted a head 91 with a check valve seat $91^a$ and a passage $91^b$ establishing communication between the spaces 67 and $87^e$. The passage $91^b$ is normally closed by a check valve 92 containing a rubber seat $92^a$ and a valve stem $92^b$, which fits loosely into the hollow stem $90^a$ and is in contact with the piston 90, so that the downward motion of the piston 90, moves the check valve 92 from its seat.

Between the spaces $87^e$ and 87 is a check valve 93 whose motion is upward, and containing suitable guides $93^a$ and a hollow stem $93^b$. A spring 94, inside of the hollow stem $93^b$ reacts against both the check valves 92 and 93 and holds them both against their seats. The check valve 92 prevents the flow of pressure from 87 and $87^e$ to 67, and the check valve 93 prevents the flow of pressure from spaces 67 and $87^e$, to 87.

The valve casing 61 (Figs. 4 and 7) has a space 95 connected by the passage 96 with the space 62. A preferably cylindrical passage 97 leads from the space 95 and contains check valve seats $97^a$ and $97^b$ at each end. The passage 97 communicates by the openings 98 with a space 99 which is connected by the passage 100 with the end $63^a$ of the cylinder. One end of the passage 97, connects with the space 101 which is connected by the passages 102, $102^a$, $102^b$ (Fig. 8) to the space 88. In the passage 97 is fitted a fluted stem 103 which is longer than the distance between $97^a$ and $97^b$, and containing at one end a check valve 104 with a rubber seat $104^a$, and at the other end a similar check valve 105, $105^b$ held by a nut $105^a$. The check valve 105, 105$^b$ is normally away from its seat 97$^b$, leaving free communication between the passages 102, 101, 97, 98, 99 and 100.

The space 95 is inclosed by a flexible metal diaphragm 106, through the center of which passes a hollow cylindrical nut, 107, which screws into a hollow cap 108, gripping tightly the diaphragm 106 and forming an air tight connection. Through the center of 107 freely passes a rod 103$^a$ which is part of the fluted stem 103. A nut 103$^b$, fastened to the rod 103 bears against the nut 107, and in conjunction with the nut 107 bearing against the check valve 104, any movement of the diaphragm is communicated to the fluted stem 103 and the check valves 104 and 105. On the opposite side of the space 95 and diaphragm 106, is a space 109, formed by and within a cap 110, which is securely fastened to the valve casing 61, and packed with a rubber gasket 110$^a$ to prevent leakage. Within the cap 110 and reacting against it, is a spring 111 which acting against the cap 108, seats the check valve 104, 104$^a$ against its seat 97$^a$ and keeps the check valve 105 away from its seat 97$^b$. The space 109 is connected by the passages 112 (Fig. 4) 113, and 113$^a$ (Fig. 10) with the space 87 which is connected to the supply pipe.

Within the valve casing 61 is a conical rotary valve 114 held tight by the washer 114$^a$ and the nut 114$^b$. Attached to the valve 114 is a suitable handle 115 which is placed at a convenient place. The object of the valve 114 is to change the lead of the passages and as here shown, it must be turned 90° in a direction termed "clockwise" to obtain the desired result. Through the valve is a passage 84$^a$ (Fig. 3) with another passage 84$^c$ at right angles, and connecting with it. When the valve is turned "clockwise" 90° from the position shown communication between 84 and 84$^b$ is closed, and communication is established between the passages 84, 84$^c$, 84$^a$, and a passage 84$^d$ connected with the space 87. At another place in the valve 114 (shown in Fig. 8) is a passage 102$^a$ with a 90° bend, which as shown establishes communication between the passages 102 and 102$^b$. When the valve 114 is turned 90° clockwise, communication between 102 and 102$^b$ is closed and communication is established between the passages 102, 102$^a$ and a passage 102$^c$ (Fig. 9) which communicates with the space 62.

Within the valve casings 61 and 61$^a$ and the valve 114 are passages 116, 116$^a$ and 116$^b$ which establish communication between the space 87 and the space 62. The turning of the valve 114 at right angles to that shown, closes communication between passages 116 and 116$^b$. At one end of the passage 116 is a check valve 117 which may be of the special design shown in Fig. 11. A screw plug 118 in the top of the valve casing 61 provides access to the check valve 117.

The check valve shown in Fig. 11 consists of a casing 117, containing a passage 116$^c$ and is connected to the passage 116 by the screw 117$^a$. The casing 117 also contains a check valve seat 118 and openings 119 and 119$^a$. Within the casing 117 is a check valve 120 of the shape shown, with a seat 121 and a small space 122 around the circumference as shown.

A hollow plunger 123 with a spring 126 acting upon it, tends to keep the check valve closed but the nut 124 on the upper end of 123, bearing against the cap 125, limits the downward motion of the plunger 123, so that the check valve 120 is free from the influence of the spring 126 for a very small distance from the seat 118. A rod 127 passing through the plunger 123 and attached to the check valve 120, has a spring 128 reacting against 127 and 124, which is sufficient to just keep the check valve 120 normally in contact with the plunger 123.

In Fig. 4$^a$ is shown a section of an automatic valve which may be used instead of that shown in Fig. 4. Instead of using the diaphragm 106 and its component parts 107 and 108 (Fig. 4), a movable piston 133 (Fig. 4$^a$) is used which is packed against leakage between the two spaces 95 and 109, by suitable means, here shown as a leather cup 134 and a spring 135 pressing outward, the whole held in place by the ring 136. Through the piston 133 is a passage 137, at one end of which are lugs 138 within the space 95, and at the other end a check valve seat 139. Passing loosely through the passage 137, is the stem of the check valve 104, against which is a check valve 140 with a rubber seat 141, and a nut 103$^b$ holding them securely to the stem 103. Reacting against the piston 133 is a spring 111 which normally holds the lugs 138 against the check valve 104 and therefore holds the same on its seat 97$^a$. In this position the check valve 140, 141 is away from its seat 139, leaving a communication of small area between the spaces 95 and 109.

In Fig. 12 is shown a form of check valve which may be used instead of that shown in Fig. 11, when an automatic valve of the form shown in Fig. 4$^a$ is used.

The valve casing 117, containing a valve seat 118, openings 119 and a passage 116$^c$, has within it a movable check valve 129, containing guides 130, and held against its seat by the spring 131, reacting against a suitable part 132 attached to the casing 117.

All of the parts of my invention hereinbefore described are here shown and described as being constructed in such manner as will, to my belief, best accomplish the desired results, but the design and construction of the individual parts may vary from that shown and described, and still not alter the principles of operation and the results obtained by my invention.

The operation of the air brake system (which I will describe in the order named in the beginning of these specifications) of the controlling valve, and auxiliary valves is substantially as follows, and, although I will here describe the auxiliary valve as being used in conjunction with the controlling valve shown in Fig. 2; the auxiliary valve may be used in conjunction with any other controlling valve or device which will accomplish any or all of the results obtained by the controlling valve herein described. In using this system, the various cars and the supply and controlling pipes 15 and 16 are coupled together, the angle cocks 17 between the cars are opened, while those at the end or ends of the train are closed. There being no pressure in the brake cylinders, the piston 81 and the slide-valve 72 of each auxiliary valve are at the end of their strokes to the left and in the position shown in the drawings. In this position of the slide-valve all communication between the space 62 and the ports 69, 70 and 71 is closed while communication between the brake cylinder and the atmosphere is established by the passages 67$^a$, 67$^b$, 69, 73, 70 and 70$^a$. The valve 114 and all other individual parts are in the positions shown in the drawings. The positions of all the individual parts of the controlling valve are also the same as shown in the drawings. With the handle 56 of the controlling valve in the position shown, there is no compression on the spring 60 and therefore no pressure in the controlling pipe 16 and its connecting passages as will be hereinafter described. A compressor or other source of pressure 12 maintains automatically any desired pressure in the main reservoir 13, thence through the pipe 14 to the controlling valve C, thence through the passages 45$^b$, 45$^a$, 45, 40, 43, 43$^a$ and 43$^b$ to the supply pipe 15; thence throughout the train and through the pipes 15$^a$ to each auxiliary valve A; thence through the passages 87$^a$, 87, 116$^b$, 116$^a$ and 116, lifting the check valve 120 from its seat 118; thence through the openings 119 to the space 62 and thence to the auxiliary reservoir 18. The main and auxiliary reservoirs, the supply pipes and the passages connecting with each, therefore have a substantially uniform pressure throughout the train.

(1) To simultaneously apply the brakes with a definite and controllable pressure. If it is desired to apply the brakes, the operator introduces into the controlling pipe 16, substantially the same pressure as he desires to be used in the brake cylinders for applying the brakes. This is accomplished by the operator moving the handle 56 of the controlling valve "clockwise" to the left, which, rotates the screw plug 55 and compresses the spring 60. The relation of the travel of the handle 56, the screw plug 55 and the size and compression of the spring 60, is such that for a total movement of the handle (about 180°) the pressure exerted by the spring 60 on one side of the piston 25, will equal the maximum working pressure desired for the brake cylinders, acting on the area of the piston 25. The operator will therefore move the handle through an arc proportional to the amount of pressure he desires to use. The pressure of the spring 60, acting on the piston 25, forces it downward together with the check valve 33, when the rod 34, coming in contact with the rod 38$^b$, forces the check valve 38 downward and away from its seat opening communication between the spaces 40 and 24 and admitting the pressure from the main reservoir and supply pipe through the passages 35$^a$, 36, 24, 48, 48$^a$ and 48$^b$ into the controlling pipe 16. As soon as the pressure in the controlling pipe and therefore in the space 24 becomes equal to the desired amount, and acting on the area of the piston 25, it equalizes the pressure exerted by the spring, the piston 25 moves up to its normal position of equilibrium, in which position the check valve 38 is seated, the rod 34 is just clear of 38$^b$ and the projections 34$^a$ are just clear of the lugs 37. The pressure thus introduced into the controlling pipe, passes through and into the pipes 16$^a$ to each auxiliary controlling valve, thence through the passages 88$^a$, 88, 102$^b$, 102$^a$, 102, 101, 97, 98, 99 and 100 into the space 63$^a$ at the left end of the operating cylinder of the auxiliary controlling valve. Here the pressure acting on the piston 81, moves it, together with the piston rod 66 to the right. As the piston rod moves to the right, the pin 77 moves the graduating valve 76$^b$ away from its seat, so that the passages 75 are in communication with the space 62 through the passages 75$^a$. The piston rod and graduating valve move to the right and when the projection 66$^b$ comes in contact with the slide-valve 72, the slide-valve also moves to the right. This motion continues until the nut 66$^c$ coming into contact with the plunger 85, the piston and slide-valve meets the increased resistance due to the compression of the spring 85$^b$. For small increments of pressure in the space 63$^a$, the compression of the spring 85$^b$ will be small and the slide valve 72 will now have a position in which the passage 75 communicates with the port 69, and the communication will be closed between the ports 69 and 70, and also between the ports 71 and 70. The brake cylinder is now closed to the atmosphere and the pressure from the auxiliary reservoir and the space 62, passes through the passages 75$^a$, 75, 69, 67$^b$ and 67$^a$ into the brake cylinder and also into the spaces and through the passages 67, 84$^b$, 84$^a$, 84, 83 and 83$^a$ into the space 63$^b$ at the right end of the operating cylinder. The pressure continues to flow from the auxiliary reservoir into the brake cylinder and its adjacent passages until the pressure in the space 63$^b$ (and therefore in the brake cylinder), is slightly in excess of the pressure in the space 63$^a$ (which is that of the controlling pipe), when the excess of pressure (which would be small and only sufficient to overcome the friction of the piston and piston rod) acting upon the piston 81 moves it together with the piston 66 to the left. The projection 66$^a$ moves the graduating valve until it is seated, when the piston and piston rod meeting the increased resistance due to the friction of the slide valve, comes to a stop. Communication between the auxiliary reservoir and the brake cylinder is now closed and therefore the brake cylinder contains substantially the same pressure as was introduced into the controlling pipe. The pressure in brake cylinder may be increased by moving the handle of the controlling valve still further to the left, compressing the spring and admitting the desired pressure to the controlling pipe, in the same manner as before described. The additional pressure acting on the piston 81 admits the additional pressure into the brake cylinder and retains it there when equal to the controlling pipe pressure, in the same manner as before described. This may be continued until the maximum force of the supply pressure will have been exerted.

To reduce the pressure in the brake cylinders, the operator reduces the pressure in the controlling pipe to substantially the same pressure that he desires to use in the brake cylinders. This is accomplished by the operator moving the handle 56 anti-clockwise to the right, which rotates the screw plug 55 moving it upward, which decreases the compression on the spring 60. In the same manner as before described the movement of the handle is proportional to the pressure. The pressure in the controlling pipe and the space 24 acting upward on the piston 25, being now greater than the downward force of the spring, the piston 25 moves upward. The check valve 33 is however prevented from following by the projections 34$^a$ engaging the lugs 37, and therefore the check valve is lowered from its seat 33$^a$. The pressure from the controlling pipe now flows past the check valve 33 and through the passages 26, 27, 28 and 29 to the atmosphere. As the pressure in the space 24 is reduced, the piston 25 is forced down by the action of the spring, until the check valve 33 is again seated. In this position any further reduction of pressure is prevented and the pressure in space 24 is in equilibrium with the pressure of the spring.

As the pressure in the controlling pipe 16 is reduced, the pressure in the space 63$^a$ is likewise reduced to the same amount, through the passages 88$^a$, 88, 102$^b$, 102$^a$, 102, 101, 97, 98, 99 and 100 connected to the pipe 16$^a$ and the controlling pipe 16. The excess pressure in the space 63$^b$ (and therefore in brake cylinder) over that in 63$^a$, acting on the piston 81 moves it to the left and the projection 66$^a$ acting on the head 76$^c$ of the graduating valve, moves it together with the slide-valve 72 to the left. This motion continues until the space 73 communicates with the port 69, when communication being now established between the brake cylinder and the atmosphere, through the passages 67$^a$, 67$^b$, 69, 73, 70 and 70$^a$, the pressure in the brake cylinder is reduced until it is slightly below that in the controlling pipe. The excess pressure in 63$^a$ (which is just sufficient to overcome the friction of the moving parts) acting on 81 now moves the piston and slide valve to the right in the same manner as hereinbefore described for applying the brakes, likewise closes communication between the brake cylinder and the atmosphere, and retains the pressure in the brake cylinder which is now substantially the same as that of the reduced pressure in the controlling pipe. Any further reduction desired may be obtained in the same manner as before described. To entirely release the brakes, the handle 56 is moved its full distance to the right to the position shown, and there now being no compression on the spring 60, the piston 25 moves up and the pressure in the controlling pipe is reduced to zero in the same manner as before described. Likewise the pressure in 63$^a$, now being zero, the pressure in the brake cylinder and the space 63$^b$ acting on the piston 81, moves it with the slide-valve, to the end of its stroke at the left. The slide-valve now being in the position shown, establishes communication through the space 73, between the brake cylinder and the atmosphere, and the pressure in the brake cylinder is entirely exhausted through the passages 67$^a$, 67$^b$, 69, 73, 70 and 70$^a$.

(2) To maintain desired pressure in brake cylinders any desired length of time, without releasing the brakes or diminishing their pressure. With the handle 56 of the controlling valve in any position for applying the brakes with the desired pressure, should any leakage occur in the controlling pipe, which would reduce the pressure below its original pressure, the excess of pressure exerted by the spring 60 on the piston 25, would move it downward, forcing the check valve 38 from its seat and admitting pressure from the main reservoir into the controlling pipe. When the pressure in the controlling pipe was again what it was originally, the piston would again assume its original position of equilibrium, and the check valve 38 would be seated thereby closing communication between the main reservoir and the controlling pipe. This operation would be repeated as often as the pressure in controlling pipe was reduced, and therefore the controlling pipe pressure would be substantially constant, as long as the operating handle remained in its position. Since the controlling pipe pressure and therefore the pressure in the space $63^a$, is practically constant, as soon as the leakage in the brake cylinder reduces the pressure in the same, the pressure in $63^b$ would decrease and the excess pressure in $63^a$ acting on the piston 81 would move it to the right and open the graduating valve $76^b$. The pressure lost from leakage would then be supplied to the brake cylinder from the auxiliary reservoir through the passages $75^a$, 75, 69, $67^b$, and $67^a$. When the pressure was restored and slightly above what it was originally, the excess pressure in $63^b$ would move the piston to the left and seat the graduating valve $76^b$. The pressure in the brake cylinder would then again be substantially the same as that in the controlling pipe. This operation would be repeated continuously and would therefore maintain the desired pressure in the brake cylinders as long as desired.

(3) To maintain uniform pressure in brake cylinders throughout train independent of the travel of pistons. When in applying the brakes as hereinbefore described, the slide-valve is in the position in which communication is established between the brake cylinder and the auxiliary reservoir, the slide-valve will remain in this position until the brake cylinder, independent of its volume, is filled with the desired pressure; and the communication between the auxiliary reservoir and brake cylinder will only be closed when the brake cylinder pressure is slightly above the controlling pipe pressure. There is no relation between the pressure in the brake cylinder and the volume of the brake cylinder and auxiliary reservoir, and therefore the brake cylinder pressure is independent of the travel of the piston.

(4) To maintain at all times full working pressure in the auxiliary reservoirs. In applying the brakes, the pressure flows from the auxiliary reservoir into the brake cylinder and the pressure in the auxiliary reservoir is thereby reduced. The excess pressure from the main reservoir 13, which is also automatically augmented, if necessary, by the compressor 12, then flows through the pipe 14 and the supply pipe 15 and $15^a$ and the passages $87^a$, 87, $116^b$, $116^a$, 116 and, lifting the check valve 120 from its seat, flows into the space 62 and the auxiliary reservoir, thereby restoring the pressure in the same to the full working pressure. This action takes place immediately upon the application of the brakes or subsequent increase in pressure, and also for any loss of pressure occasioned by leakage from the brake cylinders, or other small leakages. The brakes may therefore be successively applied and released or partially released as many times as the capacity of the compressor will permit, without materially reducing the auxiliary reservoir pressure.

(5) To make quick action emergency application of brakes. If the operator desires to make an emergency stop, he reduces the pressure in the supply pipe by turning a handle which is attached to the rotary valve 46 so that the passage $45^a$ connects the passages 47 and $47^a$. In this position all communication between the passages 45 and $45^b$ is closed, and therefore no pressure from the main reservoir 13 can reach the supply pipe. The pressure from the supply pipe now flows through the passages $43^b$, $47^a$, $45^a$ and 47 into the atmosphere, and is thereby reduced. Instead of the operator using the controlling valve an emergency stop may be made from any part of the train by opening a valve 21 (generally termed a conductor's valve), which permits the escape of the air from the supply pipe and thereby reduces the pressure in the same. This reduction of pressure is communicated by the pipe $15^a$ to the auxiliary valve space $87^a$, 87 and its connecting passages $116^b$, $116^a$, 116. The auxiliary pressure in 62 now being greater than that in 116, the excess pressure acting on the check valve 120 forces it down with the rod 127, against the slight pressure of the spring 128, and firmly seats the valve against its seat 118 thereby preventing the flow of pressure from the auxiliary reservoir into the supply pipe. Under normal conditions the pressures in the supply pipe and the auxiliary reservoirs are the same and therefore the pressures on both sides of the diaphragm 106 or the piston 133 are the same, since the space 109 is connected with the supply pipe and the space 95 is connected with the auxiliary reservoir. The spring 111 therefore normally holds the check valve 104 securely against its seat $97^a$, thereby closing communication between the space 95 and the passage 97. The pressure in the space 109 is, however, now reduced through its connection with the supply pipe by the passages 112, 113, $113^a$, 87, $87^a$, and the excess pressure from the auxiliary reservoir in the space 95, acting on the area of the diaphragm 106, moves it to the left, against the pressure of the spring 111, thereby lifting the check valve 104, $104^a$, from its seat $97^a$ and seating the check valve 105, $105^b$ against its seat $97^b$ where it is firmly held by the excess pressure 95 acting on the diaphragm. The seating of the check valve 105, $105^b$, closes all communication between the controlling pipe and the working parts of the auxiliary valve, thereby retaining all pressures automatically admitted to the same, and especially to the space $63^a$ of the operating cylinder. This is more particularly necessary when upon the parting of the train the controlling pipe is ruptured. The unseating of the check valve 104, 104ª, now admits the full auxiliary reservoir pressure from the space 62 through the spaces and passages 96, 95, 97, 98, 99 and 100, into the space 63ª at the left end of the operating cylinder. The auxiliary reservoir pressure acting on the piston 81 forces it to the extreme end of its stroke to the right, the resistance of the spring 85ᵇ being now very small in comparison to the pressure on the piston 81. The piston and piston rod 66 also moves the slide-valve 72 to the end of its stroke to the right, in which position the passage 74 is opposite the port 69 and the port 71 is uncovered through the space 78. The auxiliary reservoir pressure now passes from the space 62 through the port 71, 71ª and acting on the area of the piston forces the piston 90 downward, which coming in contact with the stem 92ᵇ forces the check valve 92 away from its seat, and thereby establishes communication between the space 67 and the space 87ᵉ. The pressure in the supply pipe and the space 87, lifts the check valve 93 away from its seat and allows the pressure from the supply pipe to pass through the spaces 87, 87ᵉ, 67, 67ª into the brake cylinder. This gives an additional reduction of pressure in the supply pipe, over the original and this additional reduction acting on the automatic quick action valve on the next car operates the valve in a similar manner, and so on throughout the train. During the operation of the quick action valve the pressure from the auxiliary reservoir is also passing through the passages 74, 69, 67ᵇ, 67ª into the brake cylinder, but the area of the passages being much smaller than that of the quick action valve, the action of the valve is not affected thereby. The flow of pressure into the brake cylinder continues until the pressures in the auxiliary reservoir and the brake cylinder are equal; when the pressures on both sides of the piston 90 being the same, the check valve 92 is seated by the spring 94 and the check valve 93 prevents the return of the brake cylinder pressure to the supply pipe; also the pressures on both sides of the piston 81 being the same the slide valve 72 assumes its intermediate position.

To prevent the automatic application of the brakes when a car (or cars) is uncoupled from the rest of train, which might result through a slight leakage from the supply pipe, the check valve 120 shown in Fig. 11, is kept slightly above its seat, as shown, permitting a small amount of air to pass from the auxiliary reservoir into the supply pipe and thereby maintaining the same pressure in the supply pipe and the auxiliary reservoir. A sudden reduction in pressure in the supply pipe, however, seats the valve 120 and therefore retains the pressure in the auxiliary reservoir. Instead of using the check valve shown in Fig. 11, a check valve shown in Fig. 12 may be used and also a piston, shown in Fig. 4ª may be used to operate the double seated check valve 104, 105, instead of the diaphragm 106. In this case the check valve 129 (Fig. 12) is kept seated by the spring 131 thereby preventing any flow of pressure from the auxiliary reservoir into the supply pipe, and the space 137 between the piston 133 and 104 allows a small volume of air to pass from the auxiliary reservoir to the supply pipe for the purposes hereinbefore stated. A sudden reduction of pressure in the supply pipe and therefore in the space 109, gives an excess of pressure in 95 which acting on the piston 133 moves the piston against the pressure of the spring 111 until the check valve 140, 141 becomes seated, thereby closing all communication between the spaces 95 and 109, and upon the continued motion of the piston 133, moves the valve stem 103, so that the check valve 104—104ª is unseated and the check valve 105 is seated in the same manner as described in connection with the diaphragm 106. After an emergency stop as above described, the brakes are released, by admitting pressure into the supply pipe until the pressure is the same as that in the auxiliary reservoir, in which case the automatic valve assumes its normal position as shown, thereby allowing the pressure from 63ª to escape into the controlling pipe and thence to the atmosphere through the controlling valve. This releases the brakes in the same manner as hereinbefore described for releasing the brakes after an ordinary application. A quick action emergency application may also be made by turning the handle 56 quickly to the position for maximum pressure in the controlling pipe. This will seat the check valve 38 on its seat 41—42, thereby preventing the main reservoir pressure from flowing into the supply pipe and the pressure from the supply pipe will flow into the controlling pipe as hereinbefore described. As the relative volumes of the control pipe and the supply pipe and their connections is such that the pressure in the control pipe cannot be sufficient to lift the check valve 38 from its seat 41, the pressure in the supply pipe will be reduced sufficiently to cause the operation of the automatic and quick action devices in the same manner as hereinbefore described.

(6) The bursting of the supply pipe, parting of the train or other accident to the supply pipe necessarily reduces the pressure in the supply pipe and therefore automatically applies the brakes in the same manner as previously described.

(7) When the handle 56 of the controlling valve is set to maintain a pressure in the brake cylinders, which I will assume to be about 15 lbs. per sq. in. or more, and an accident of any kind should occur to the controlling pipe, such as the bursting of a hose connection, the pressure in the controlling pipe would immediately escape. This would release the brakes in the manner hereinbefore described, but before the brakes had become fully released, they would be immediately applied automatically in the following manner: The relation of the parts of the controlling valve are so adjusted that when the handle is set for any pressure above say 15 lbs. per sq. in., any reduction in pressure of 15 lbs. or more in the controlling pipe will cause the excess pressure due to the spring 60 to move the piston 25 downward until the seat 41 of the check valve 38 becomes seated against the seat 42, and also unseating the check valve 38 from its seat $38^a$. The seating of the check valve 38 against its seat 42 closes all communication between the source of pressure (through the pipe 14 and passages $45^b$, $45^a$, 45) and the supply pipe (through the passages 40, 43, $43^a$, $43^b$). The pressure now escapes from the supply pipe through the passages 40, 34, $35^a$, 36, 24, 48, $48^a$, $48^b$ to the controlling pipe and thence through the rupture in the controlling pipe into the atmosphere, which reduces the pressure in the supply pipe and therefore automatically applies the brakes in the manner hereinbefore described.

(8) In order that a car or locomotive fitted with my invention, may be interchanged with those using the present standard brake system, the controlling valve and auxiliary valve may be converted so that either of them may be used in connection with the present system, in which the brakes are applied by a reduction of pressure in the train pipe (supply pipe). To convert the action of the controlling valve, the valve 49 is turned 90° which closes all communication between the space 24 and the controlling pipe. The valve 44 is also turned anti-clockwise which closes the passage 43, thereby closing communication between the source of pressure in 12, 13, 14, $45^b$, $45^a$, 40 and the supply pipe. The passage $43^a$ now connects the supply pipe with the space 24, through the passages $43^b$, $43^a$ and $43^c$. The handle 56 is then turned about 180° clockwise to the left, in which position, which may be termed the "running position" the working pressure, about 70 lbs., is admitted to and maintained in the train pipe (supply pipe) in the same manner as hereinbefore described for maintaining any desired pressure in the controlling pipe. To apply the brakes the handle 56 is turned anti-clockwise to the right, thereby reducing the pressure in the train pipe (supply pipe) any required amount, in the same manner as hereinbefore described for reducing the pressure in the controlling pipe. To release the brakes, the handle is turned clockwise to the left, but beyond the "running position" to a position which may be termed the "release position." This position allows greater pressure to be introduced into the train pipe and, also, to insure the prompt release of the brakes, an additional connection is made between the train pipe and the source of pressure in the following manner: When the handle 56 is just beyond the "running position" the lower part $56^a$ of the handle comes in contact with the plunger 54 and the continued movement of the handle forces the plunger 54 down, thereby lowering the check valve 51 from its seat, through the medium of the rod 53. The pressure now flows through the passages $45^b$, $45^a$, 45, $50^a$, 50, $50^b$, 48, 24, $43^c$, $43^a$ and $43^b$ into the train pipe, in addition to that flowing past the check valve 38. As soon as the brakes are released the handle is returned to the "running position". While in this position, should an accident occur to the train pipe, the seat 41 of the check valve 38 would become seated on the seat 42, (thereby cutting off the source of pressure from the train pipe) in the same manner as hereinbefore described for a similar accident to the controlling pipe. To convert the auxiliary valve so that it may be used with the present standard brake system, the handle 115, which is placed in a convenient position under the car, is turned 90° clockwise, thereby turning the rotary valve 114 and changing the lead of the passages 100 connected thereto in the following manner: Communication between the supply pipe (train pipe) and the auxiliary reservoir through the passages 116 and $116^b$, is closed (Fig. 9). Communication between the end $63^b$ of the operating cylinder, and the brake cylinder, through the passages $83^a$, 83, 84, $84^b$, 67 and $67^a$ is closed (Fig. 3). Communication is established between the space $63^b$ and the train pipe (supply pipe) through the passages $83^a$, 84, $84^c$, $84^a$, $84^d$, 87 and $87^a$ (Fig. 3). Communication between the end $63^a$ of the operating cylinder and the controlling pipe through the passages 100, 99, 98, 97, 101, 102, $102^b$, 88 and $88^a$ is closed (Fig. 8). Communication is established between the space $63^a$ and the auxiliary reservoir through the passages 100, 99, 98, 97, 101, 102, $102^a$, $102^c$ and 62. Should the reduction of pressure in the train pipe be sufficient to operate the automatic valve and diaphragm, 103 and 106 whereby the check valve 105 is seated and 104 is unseated, the communication between the space $63^a$ and the auxiliary reservoir would still be maintained through the passages 100, 99, 98, 97, 95, 96 and 62. Since the action of the automatic valve and diaphragm 103, 106 is neutralized; and the lead of the passages and action of the parts is now substantially the same as in the present standard so-called "quick action triple valve," the operation of which it will be unnecessary to describe; the auxiliary controlling valve may now be used in connection with the present standard air brake systems.

My invention as hereinbefore shown and described, contains all the elements and parts for accomplishing any or all of the results for operating the brakes, described in the beginning of this specification; but, other combinations of the parts than are here shown, may be used, or certain of the parts may be omitted in order to obtain one or more only of the results described.

A few of the variations from the combinations shown may be briefly indicated as follows: In the controlling valve, the converting devices may be omitted. In the auxiliary controlling valve, the converting devices may be omitted, or the quick action devices may be omitted, or both the quick action and converting devices may be omitted.

Having thus described my invention, I claim as new and desire to secure by Letters Patent:

1. In an air-brake system, the combination with a source of pressure, of a supply pipe, a control pipe, a brake cylinder, a primary controlling valve controlling the pressure in the control pipe, and an auxiliary controlling valve controlling the brake cylinder pressure and operated by the influence of the control pipe pressure and the brake cylinder pressure.

2. In an air brake system, the combination with a source of pressure, of a supply pipe, a control pipe, an auxiliary reservoir, a brake cylinder, a primary controlling valve controlling the pressure in the control pipe, an auxiliary controlling valve controlling the brake cylinder pressure and operated by the control pipe and brake cylinder pressures, devices operated by variations in pressure between the auxiliary reservoir and the supply pipe for controlling the brake cylinder pressure, and automatic devices operating the last named devices upon a rupture of the control pipe.

3. In an air brake system, the combination with a source of pressure, of a supply pipe, a control pipe, an auxiliary reservoir, a brake cylinder, a manually operated valve controlling the pressure in the control pipe, devices for maintaining substantially the same pressure in the brake cylinder as that in the control pipe, devices operated by variations in the supply pipe pressure for controlling the brake cylinder pressure, and automatic devices operating the last named devices upon a rupture of the control pipe.

4. In an air brake system, the combination with a source of pressure, of a supply pipe, a control pipe, an auxiliary reservoir, a brake cylinder, a primary controlling valve controlling the pressure in the control pipe, an auxiliary controlling valve controlling the brake cylinder pressure and operated by the control pipe and brake cylinder pressures, devices operated by variations in pressure between the supply pipe and the auxiliary reservoir for controlling the brake cylinder pressure, automatic devices operating the last named devices upon a rupture of the control pipe, and devices operated by a reduction of pressure in the supply pipe for increasing that reduction and the rapidity of reduction of pressure in the supply pipe.

5. In an air brake system, the combination with a source of pressure, of a supply pipe, a control pipe, an auxiliary reservoir, a brake cylinder, a manually operated valve controlling the pressure in the control pipe, devices for maintaining substantially the same pressure in the brake cylinder as that in the control pipe, devices operated by variations in the supply pipe pressure for controlling the brake cylinder pressure, and devices operated by a reduction of pressure in the supply pipe for increasing that reduction and the rapidity of reduction of pressure in the supply pipe.

6. In an air brake system, the combination with a source of pressure, of a supply pipe, a control pipe, an auxiliary reservoir, a brake cylinder, a primary controlling valve controlling the pressure in the control pipe, an auxiliary controlling valve controlling the brake cylinder pressure and operated by the control pipe and brake cylinder pressures, devices operated by variations in pressure between the supply pipe and the auxiliary reservoir for controlling the brake cylinder pressure, automatic devices operating the last named devices upon a rupture of the control pipe, and devices for converting the action of the said valves and devices so that the pressure in the brake cylinder may be controlled by the influence of the supply pipe and auxiliary reservoir pressures.

7. In an air brake system, the combination with a source of pressure, of a supply pipe, a control pipe, an auxiliary reservoir, a brake cylinder, a manually operated valve controlling the pressure in the control pipe, devices for maintaining substantially the same pressure in the brake cylinder as that in the control pipe, devices operated by variations in the supply pipe pressure for controlling the brake cylinder pressure, and devices for converting the action of the said valves and devices so that the pressure in the brake cylinder may be controlled by the influence of the supply pipe and auxiliary reservoir pressures.

8. In an air brake system the combination with a source of pressure, a supply pipe, a control pipe, an auxiliary reservoir, a brake cylinder, a primary controlling valve controlling the pressure in the control pipe, an auxiliary controlling valve controlling the brake cylinder pressure and operated by the control pipe and brake cylinder pressures, devices operated by variations in pressure between the supply pipe and the auxiliary reservoir for controlling the brake cylinder pressure, automatic devices operating the last named devices upon a rupture of the control pipe, devices operated by a reduction of pressure in the supply pipe for increasing that reduction and the rapidity of reduction of pressure in the supply pipe, and devices for converting the action of the said valves and devices so that the pressure in the brake cylinder may be controlled by the influence of the supply pipe and auxiliary reservoir pressures.

9. In an air brake system, the combination with a source of pressure, of a supply pipe, a control pipe, an auxiliary reservoir, a brake cylinder, a manually operated valve controlling the pressure in the control pipe, devices for maintaining substantially the same pressure in the brake cylinder as that in the control pipe, devices operated by variations in the supply pipe pressure for controlling the brake cylinder pressure, devices operated by a reduction of pressure in the supply pipe for increasing that reduction and the rapidity of reduction of pressure in the supply pipe, and devices for converting the action of the said valves and devices so that the pressure in the brake cylinder may be controlled by the influence of the supply pipe and auxiliary reservoir pressures.

10. In a valve, the combination with a source of pressure, of a control pipe and a supply pipe, devices for maintaining any desired pressure in the control pipe, and automatic devices for closing communication between the source of pressure and the supply pipe and opening communication between the control pipe and the supply pipe, the said automatic devices being operated by a sudden reduction of the control pipe pressure.

11. In a valve, the combination with a source of pressure, of a control pipe and a supply pipe, devices for maintaining any desired pressure in the control pipe, automatic devices for closing communication between the source of pressure and the supply pipe and opening communication between the control pipe and the supply pipe, the said automatic devices being operated by a sudden reduction of the control pipe pressure, and means for converting the action of the valve so that it becomes a valve communicating with a source of pressure and a supply pipe (train pipe), devices for maintaining any desired pressure in the supply pipe (train pipe), and automatic devices for closing communication between the source of pressure and the supply pipe (train pipe) upon a rapid reduction of pressure in the supply pipe (train pipe).

12. In a valve, the combination with a source of pressure, of a control pipe and a supply pipe, devices for maintaining any desired pressure in the control pipe, automatic devices for closing communication between the source of pressure and the supply pipe and opening communication between the control pipe and the supply pipe, the said automatic devices being operated by a sudden reduction of the control pipe pressure, and manually operated devices for closing communication between the source of pressure and the supply pipe and opening communication between the supply pipe and the atmosphere.

13. In a valve, the combination with a source of pressure, of a control pipe and a supply pipe, devices for maintaining any desired pressure in the control pipe, automatic devices for closing communication between the source of pressure and the supply pipe and opening communication between the control pipe and the supply pipe, the said automatic devices being operated by a sudden reduction of the control pipe pressure, manually operated devices for closing communication between the source of pressure and the supply pipe and opening communication between the supply pipe and the atmosphere, and manually operated devices for controlling an auxiliary communication between the source of pressure and the control pipe.

14. In a valve, the combination with a source of pressure and a supply pipe (train pipe), devices for maintaining any desired pressure in the supply pipe (train pipe), automatic devices for closing communication between the source of pressure and the supply pipe (train pipe) upon a rapid reduction of pressure in the supply pipe (train pipe), manually operated devices for closing communication between the source of pressure and the supply pipe and opening communication between the supply pipe and the atmosphere, and manually operated devices for controlling an auxiliary communication between the source of pressure and the supply pipe (train pipe).

15. In a valve, the combination with a source of pressure, of a control pipe and a supply pipe, devices for maintaining any desired pressure in the control pipe, automatic devices for closing communication between the source of pressure and the supply pipe and opening communication between the control pipe and the supply pipe, the said automatic devices being operated by a sudden reduction of the control pipe pressure, manually operated devices for closing communication between the source of pressure and the supply pipe and opening communication between the supply pipe and the atmosphere, manually operated devices for controlling an auxiliary communication between the source of pressure and the control pipe, and means for converting the action of the said valve, devices, and means, substantially as and for the purpose specified.

16. A valve communicating with a source of pressure, a control pipe and a supply pipe, devices controlling communication between the supply pipe and the control pipe, the control pipe and the atmosphere, and, the source of pressure and the supply pipe, and means for operating said devices by the influence of a controllable force and the control pipe pressure.

17. A valve communicating with a source of pressure, a control pipe and a supply pipe, devices controlling communication between the supply pipe and the control pipe, the control pipe and the atmosphere, and, the source of pressure and the supply pipe, means for operating said devices by the influence of a controllable force and the control pipe pressure and means for rapidly reducing the pressure in the supply pipe and controlling the pressure in the same.

18. A valve communicating with a source of pressure, a control pipe and a supply pipe, devices controlling communication between the supply pipe and the control pipe, the control pipe and the atmosphere, and, the source of pressure and the supply pipe, means for operating said devices by the influence of a controllable force and the control pipe pressure, means for rapidly reducing the pressure in the supply pipe and controlling the pressure in the same, and means for converting the action of the said valve, devices and means, substantially as, and for the purpose specified.

19. A controlling valve comprising a valve casing containing a movable piston or diaphragm, on one side of which is a space communicating with a control pipe, the other side coacting with means for exerting any desired pressure on the said piston or diaphragm, a check valve contained in the piston or diaphragm for controlling communication between the control pipe and the atmosphere and normally closing the same, means connecting the control pipe with a supply pipe, means connecting the supply pipe with a source of pressure, a double seated check valve controlling the means connecting the control pipe with the supply pipe, the same being normally closed, and also controlling the means connecting the supply pipe with the source of pressure, the same being normally open, devices for operating both of the said check valves from their normal positions by the motion of the movable piston or diaphragm substantially as and for the purpose specified, and manually operated devices for closing communication between the supply pipe and the source of pressure and opening communication between the supply pipe and the atmosphere.

20. A controlling valve comprising a valve casing containing a movable piston or diaphragm, on one side of which is a space communicating with a control pipe, the other side co-acting with means for exerting any desired pressure on the said piston or diaphragm, a check valve contained in the piston or diaphragm for controlling communication between the control pipe and the atmosphere and normally closing the same, means connecting the control pipe with a supply pipe, means connecting the supply pipe with a source of pressure, a double seated valve controlling the means connecting the control pipe with the supply pipe, the same being normally closed, and also controlling the means connecting the supply pipe with a source of pressure, the same being normally open, devices for operating both of the said check valves from the normal positions by the motion of the movable piston or diaphragm substantially as and for the purpose specified, manually operated devices for closing communication between the supply pipe and the source of pressure and opening communication between the supply pipe and the atmosphere, and means for converting the action of the said valve, devices and means, substantially as and for the purpose specified.

21. A valve communicating with a supply pipe, a control pipe and a brake cylinder, comprising devices for controlling communication between the supply pipe and the brake cylinder, also the brake cylinder with the atmosphere, and means for operating said devices by the influence of the control pipe pressure and the brake cylinder pressure.

22. A valve communicating with a supply pipe, a control pipe, an auxiliary reservoir and a brake cylinder, comprising devices for controlling communication between the supply pipe and the brake cylinder, also the brake cylinder with the atmosphere, and means for operating said devices by the influence of the control pipe pressure and the brake cylinder pressure.

23. A valve communicating with a source of fluid pressure, an auxiliary reservoir, a controllable pressure and a brake cylinder, comprising devices for maintaining substantially the same pressure in the brake cylinder as that of the controllable pressure, and devices admitting the auxiliary pressure to and maintaining it in the brake cylinder upon a reduction of pressure in the source.

24. A valve communicating with a supply pipe, a control pipe, an auxiliary reservoir and a brake cylinder, comprising means for controlling the brake cylinder pressure through devices operated by the influence of the control pipe pressure, and means for controlling the brake cylinder pressure through devices operated by variations in the supply pipe pressure.

25. A valve communicating with a supply pipe, a control pipe, an auxiliary reservoir and a brake cylinder, comprising a slide valve for controlling communication between the auxiliary reservoir and the brake cylinder, also the brake cylinder and the atmosphere, means for operating said slide valve by the influence of the control pipe pressure and the brake cylinder pressure, and auxiliary devices for controlling the brake cylinder pressure, the said auxiliary devices being operated by variations in pressure between the auxiliary reservoir and the supply pipe.

26. A valve communicating with a source of fluid pressure, an auxiliary reservoir, a controllable pressure and a brake cylinder, comprising devices for maintaining substantially the same pressure in the brake cylinder as that of the controllable pressure, devices admitting the auxiliary pressure to and maintaining it in the brake cylinder upon a reduction of pressure in the source, and devices operated by a reduction of pressure in the source for increasing that reduction and the rapidity of reduction of pressure in the source.

27. A valve communicating with a supply pipe, a control pipe, an auxiliary reservoir and a brake cylinder, comprising means for controlling the brake cylinder pressure through devices operated by the influence of the control pipe pressure, means for controlling the brake cylinder pressure through devices operated by variations in the supply pipe pressure, and devices operated by a sudden and heavy increase of pressure in the control pipe or by a reduction of pressure in the supply pipe for reducing the pressure in the supply pipe.

28. A valve communicating with a supply pipe, a control pipe, an auxiliary reservoir and a brake cylinder, comprising devices for controlling communication between the auxiliary reservoir and the brake cylinder, also the brake cylinder and the atmosphere, means for operating said devices by the influence of the control pipe pressure and the brake cylinder pressure, auxiliary devices for controlling the brake cylinder pressure, the said auxiliary devices being operated by variations in pressure between the auxiliary reservoir and the supply pipe, and devices operated by a sudden and heavy increase of pressure in the control pipe or by a reduction of pressure in the supply pipe, for reducing the pressure, or increasing the reduction and rapidity of reduction of pressure in the supply pipe.

29. A valve communicating with a source of fluid pressure, an auxiliary reservoir, a controllable pressure and a brake cylinder, comprising devices for maintaining substantially the same pressure in the brake cylinder as that of the controllable pressure, devices admitting the auxiliary pressure to and maintaining it in the brake cylinder upon a reduction of pressure in the source, and devices for converting the action of the valve and its component devices, so that the pressure in the brake cylinder may be controlled by the influence of the supply pipe and auxiliary reservoir pressures.

30. A valve communicating with a supply pipe, a control pipe, an auxiliary reservoir and a brake cylinder, comprising means for controlling the brake cylinder pressure through devices operated by the influence of the control pipe pressure, means for controlling the brake cylinder pressure through devices operated by variations in the supply pipe pressure, and devices for converting the action of the valve and its component parts, so that the pressure in the brake cylinder may be controlled by the influence of the supply pipe and auxiliary reservoir pressures.

31. A valve communicating with a supply pipe, a control pipe, an auxiliary reservoir and a brake cylinder, comprising devices for controlling communication between the auxiliary reservior and the brake cylinder, also the brake cylinder and the atmosphere, means for operating said devices by the influence of the control pipe pressure and the brake cylinder pressure, auxiliary devices for controlling the brake cylinder pressure, the said auxiliary devices being operated by variations in pressure between the auxiliary reservoir and the supply pipe, and devices for converting the action of the valve and its component devices, so that the pressure in the brake cylinder may be controlled by the influence of the supply pipe and auxiliary reservoir pressures.

32. A valve communicating with a source of fluid pressure, an auxiliary reservoir, a controllable pressure and a brake cylinder, comprising devices for maintaining substantially the same pressure in the brake cylinder as that of the controllable pressure, devices admitting the auxiliary pressure to and maintaining it in the brake cylinder upon a reduction of pressure in the source, devices operated by a reduction of pressure in the source for increasing that reduction and the rapidity of reduction of pressure in the source, and, devices for converting the action of the valve and its component devices, so that the pressure in the brake cylinder may be controlled by the influence of the supply pipe and auxiliary reservoir pressures.

33. A valve communicating with a supply pipe, a control pipe, an auxiliary reservoir and a brake cylinder, comprising means for controlling the brake cylinder pressure through devices operated by the influence of the control pipe pressure, means for controlling the brake cylinder pressure through devices operated by variations in the supply pipe pressure, devices operated by a sudden and heavy increase of pressure in the control pipe or by a reduction of pressure in the supply pipe for reducing the pressure in the supply pipe, and devices for converting the action of the valve and its component devices, so that the pressure in the brake cylinder may be controlled by the influence of the supply pipe and auxiliary reservoir pressures.

34. A valve communicating with a supply pipe, a control pipe, an auxiliary reservoir and a brake cylinder, comprising devices for controlling communication between the auxiliary reservoir and the brake cylinder, also the brake cylinder and the atmosphere, means for operating the said devices by the influence of the control pipe pressure and the brake cylinder pressure, auxiliary devices for controlling the brake cylinder pressure, the said auxiliary devices being operated by variations in pressure between the auxiliary reservoir and the supply pipe, devices operated by a sudden and heavy increase of pressure in the control pipe or by a reduction of pressure in the supply pipe, for reducing the pressure or increasing the reduction of pressure in the supply pipe and, devices for converting the action of the valve and its component devices, so that the pressure in the brake cylinder may be controlled by the influence of the supply pipe and auxiliary reservoir pressures.

35. A valve comprising means for communicating with an auxiliary reservoir and a brake cylinder; a passage connecting the auxiliary reservoir with a supply pipe, devices for automatically closing communication between the auxiliary reservoir and the supply pipe, upon a rapid reduction of pressure in the supply pipe; devices for controlling communication between the auxiliary reservoir and brake cylinder, also controlling the brake cylinder exhaust, means connecting said devices with a movable piston operating in a closed cylinder; devices influencing the motion of the movable piston in coöperation with the pressures acting on the piston; a passage connecting one end of the said operating cylinder with the brake cylinder; a passage connecting the other end of the operating cylinder with a control pipe; an auxiliary passage connecting the last named end of the operating cylinder with the auxiliary reservoir; devices operated by means influenced by the supply pipe pressure and the auxiliary reservoir pressure, for normally closing communication between the auxiliary reservoir and the last named auxiliary passage, also normally keeping open the communication between the operating cylinder and the control pipe, the said devices and means opening communication between the said auxiliary passage and the auxiliary reservoir and closing communication between the operating cylinder and the control pipe, when the pressure in the supply pipe is less by a predetermined amount than the pressure in the auxiliary reservoir.

36. A valve comprising means for communicating with an auxiliary reservoir and a brake cylinder; a passage connecting the auxiliary reservoir with a supply pipe, devices for automatically closing communication between the auxiliary reservoir and the supply pipe, upon a rapid reduction of pressure in the supply pipe; devices for controlling communication between the auxiliary reservoir and brake cylinder, also controlling the brake cylinder exhaust, means connecting said devices with a movable piston operating in a closed cylinder; devices influencing the motion of the movable piston in coöperation with the pressures acting on the piston; a passage connecting one end of the said operating cylinder with the brake cylinder; a passage connecting the other end of the operating cylinder with a control pipe; an auxiliary passage connecting the last named end of the operating cylinder with the auxiliary reservoir; devices operated by means influenced by the supply pipe pressure and the auxiliary reservoir pressure, for normally closing communication between the auxiliary reservoir and the last named auxiliary passage, also normally keeping open the communication between the operating cylinder and the control pipe, the said devices and means opening communication between the said auxiliary passage and the auxiliary reservoir, and closing communication between the operating cylinder and the control pipe, when the pressure in the supply pipe is less by a predetermined amount than the pressure in the auxiliary reservoir; and, devices for opening communication between the supply pipe and the brake cylinder and preventing the return of pressure from brake cylinder to the supply pipe, the said devices being operated by means influenced by a sudden and heavy increase of pressure in the control pressure end of the operating cylinder.

37. A valve comprising means for communicating with an auxiliary reservoir and a brake cylinder; a passage connecting the auxiliary reservoir with a supply pipe, devices for automatically closing communication between the auxiliary reservoir and the supply pipe, upon a rapid reduction of pressure in the supply pipe; devices for controlling communication between the auxiliary reservoir and brake cylinder, also controlling the brake cylinder exhaust, means connecting said devices with a movable piston operating in a closed cylinder; devices influencing the motion of the movable piston in coöperation with the pressures acting on the piston; a passage connecting one end of the said operating cylinder with the brake cylinder; a passage connecting the other end of the operating cylinder with a control pipe; an auxiliary passage connecting the last named end of the operating cylinder with the auxiliary reservoir; devices operated by means influenced by the supply pipe pressure and the auxiliary reservoir pressure, for normally closing communication between the auxiliary reservoir and the last named auxiliary passage, also normally keeping open the communication between the operating cylinder and the control pipe, the said devices and means opening communication between the said auxiliary passage and the auxiliary reservoir, and closing communication between the operating cylinder and the control pipe, when the pressure in the supply pipe is less by a predetermined amount than the pressure in the auxiliary reservoir; devices for opening communication between the supply pipe and the brake cylinder and preventing the return of pressure from brake cylinder to the supply pipe, the said devices being operated by means influenced by a sudden and heavy increase of pressure in the control pressure end of the operating cylinder; a small passage between the two ends of the operating cylinder substantially as and for the purpose specified, and, a manually operated valve for changing the lead of the ports and passages, so that the valve may be used in connection with air brake systems in which the brakes are operated by the influence of the pressure in the supply pipe and the auxiliary reservoir.

38. A valve comprising means for communicating with an auxiliary reservoir and a brake cylinder; a passage connecting the auxiliary reservoir with a supply pipe; a check valve preventing a return of pressure from the auxiliary reservoir to the supply pipe; devices for controlling communication between the auxiliary reservoir and the brake cylinder, also controlling the brake cylinder exhaust; means connecting said devices with a movable piston operating in a closed cylinder; devices influencing the motion of the movable piston in coöperation with the pressures acting on the piston; a passage connecting one end of the said operating cylinder with the brake cylinder; a passage connecting the other end of the operating cylinder with a control pipe; an auxiliary passage connecting the last named passage with the auxiliary reservoir; a double seated check valve controlling communication between the control pipe and the operating cylinder, also controlling communication between the auxiliary reservoir and the said auxiliary passage; a movable piston operating in a closed cylinder; means connecting the said movable piston with the double seated check valve; a passage connecting one end of the said cylinder with the auxiliary reservoir; a passage connecting the other end of cylinder with the supply pipe; a spring acting against the movable piston and augmenting the force upon the movable piston due to the supply pipe pressure, the said augmented force holding the double seated check valve in its normal position, in which communication between the auxiliary reservoir and the auxiliary passage is closed, and communication between the control pipe and the operating cylinder is open; a small passage in the movable piston establishing communication between the auxiliary reservoir and the supply pipe, and devices closing said small passage upon a rapid decrease of pressure in the supply pipe.

39. A valve comprising means for communicating with an auxiliary reservoir and a brake cylinder; a passage connecting the auxiliary reservoir with a supply pipe; a check valve preventing a return of pressure from the auxiliary reservoir to the supply pipe; devices for controlling communication between the auxiliary reservoir and brake cylinder, also controlling the brake cylinder exhaust; means connecting said devices with a movable piston operating in a closed cylinder; devices influencing the motion of the movable piston in coöperation with the pressures acting on the piston; a passage connecting one end of the said operating cylinder with the brake cylinder; a passage connecting the other end of the operating cylinder with a control pipe; an auxiliary passage connecting the last named passage with the auxiliary reservoir; a double seated check valve controlling communication between the control pipe and the operating cylinder, also controlling communication between the auxiliary reservoir and the said auxiliary passage; a movable piston operating in a closed cylinder; means connecting the said movable piston with the double seated check valve; a passage connecting one end of the said cylinder with the auxiliary reservoir; a passage connecting the other end of cylinder with the supply pipe; a spring acting against the movable piston and augmenting the force upon the movable piston due to the supply pipe pressure, the said augmented force holding the double seated check valve in its normal position, in which communication between the auxiliary reservoir and the auxiliary passage is closed, and communication between the control pipe and the operating cylinder is open; a small passage in the movable piston establishing communication between the auxiliary reservoir and the supply pipe, devices closing said small passage upon a rapid decrease of pressure in the supply pipe; and, devices for opening communication between the supply pipe and the brake cylinder and preventing the return of pressure from the brake cylinder to the supply pipe, the said devices being operated by a sudden and heavy increase of pressure in the control pressure end of the operating cylinder.

40. A valve comprising means for communicating with an auxiliary reservoir and a brake cylinder; a passage connecting the auxiliary reservoir with a supply pipe; a check valve preventing a return of pressure from the auxiliary reservoir to the supply pipe; devices for controlling communication between the auxiliary reservoir and brake cylinder, also controlling the brake cylinder exhaust; means connecting said devices with a movable piston operating in a closed cylinder; devices influencing the motion of the movable piston in coöperation with the pressures acting on the piston; a passage connecting one end of the said operating cylinder with the brake cylinder; a passage connecting the other end of the operating cylinder with a control pipe; an auxiliary passage connecting the last named passage with the auxiliary reservoir; a double seated check valve controlling communication between the control pipe and the operating cylinder also controlling communication between the auxiliary reservoir and the said auxiliary passage; a movable piston operating in a closed cylinder; means connecting the said movable piston with the double seated check valve; a passage connecting one end of the said cylinder with the auxiliary reservoir; a passage connecting the other end of cylinder with the supply pipe; a spring acting against the movable piston and augmenting the force upon the movable piston due to the supply pipe pressure, the said augmented force holding the double seated check valve in its normal position, in which communication between the auxiliary reservoir and the auxiliary passage is closed, and communication between the control pipe and the operating cylinder is open; a small passage in the movable piston establishing communication between the auxiliary reservoir and the supply pipe; devices closing said small passage upon a rapid decrease of pressure in the supply pipe; devices for opening communication between the supply pipe and the brake cylinder and preventing the return of pressure from the brake cylinder to the supply pipe, the said devices being operated by a sudden and heavy increase of pressure in the control pressure end of the operating cylinder; a small passage between the two ends of the operating cylinder substantially as and for the purpose specified; and, a manually operated valve for changing the lead of the ports and passages, so that the valve may be used in connection with air brake systems in which the brakes are operated by the influence of the pressure in the supply pipe and the auxiliary reservoir.

41. A valve comprising means for communicating with an auxiliary reservoir; a passage connecting the auxiliary reservoir with a supply pipe; devices permitting a small gradual return of pressure from the auxiliary reservoir to the supply pipe, the said devices closing communication between the auxiliary reservoir and the supply pipe upon a rapid reduction of pressure in the supply pipe; a passage connecting the auxiliary reservoir with a brake cylinder; a slide valve controlling communication between the said passage and the auxiliary reservoir, also controlling communication between the said passage and an exhaust port; an auxiliary device contained in the slide valve controlling communication between the auxiliary reservoir and brake cylinder; means substantially as and for the purpose specified connecting the slide valve and its auxiliary device with a movable piston operating in a closed cylinder; a passage connecting one end of the said operating cylinder with the brake cylinder; a passage connecting the other end of the operating cylinder with a control pipe; an auxiliary passage connecting the last named passage with the auxiliary reservoir; a double seated check valve controlling communication between the control pipe and the operating cylinder, also controlling communication between the auxiliary reservoir and the said auxiliary passage; a closed space divided into two parts by a flexible diaphragm; means connecting the flexible diaphragm with the double seated valve; a passage connecting one part of the said closed space with the auxiliary reservoir; a passage connecting the other part of the closed space with the supply pipe; a spring acting against the flexible diaphragm and augmenting the force upon the diaphragm due to the supply pipe pressure, the said augmented force holding the double seated check valve in its normal position, in which communication between the auxiliary reservoir and the auxiliary passage is closed, and communication between the control pipe and the operating cylinder is open; means for offering a resistance to the motion of the operating piston for a part of its stroke, the said resistance reacting against the effect of the control pipe pressure; means establishing communication between the brake cylinder and the supply pipe; two check valves controlling the said communication between the brake cylinder and the supply pipe, one of which prevents pressure flowing from supply pipe into brake cylinder, the other prevents the flow of pressure from brake cylinder into the supply pipe; a piston coacting with the first named check valve and movable in a cylinder one end of which communicates with the brake cylinder, the other end communicating by a passage with the auxiliary reservoir, the communication between the auxiliary reservoir and the said passage being controlled by the slide valve substantially as and for the purpose specified.

42. A valve comprising means for communicating with an auxiliary reservoir; a passage connecting the auxiliary reservoir with a supply pipe; devices permitting a small gradual return of pressure from the auxiliary reservoir to the supply pipe, the said devices closing communication between the auxiliary reservoir and the supply pipe upon a rapid reduction of pressure in the supply pipe; a passage connecting the auxiliary reservoir with a brake cylinder; a slide valve controlling communication between the said passage and the auxiliary reservoir also controlling communication between the said passage and an exhaust port; an auxiliary device contained in the slide valve controlling communication between the auxiliary reservoir and brake cylinder; means substantially as and for the purpose specified connecting the slide valve and its auxiliary device with a movable piston operating in a closed cylinder; a passage connecting one end of the said operating cylinder with the brake cylinder; a passage connecting the other end of the operating cylinder with a control pipe; an auxiliary passage connecting the last named passage with the auxiliary reservoir; a double seated check valve controlling communication between the control pipe and the operating cylinder also controlling communication between the auxiliary reservoir and the said auxiliary passage; a closed space divided into two parts by a flexible diaphragm; means connecting the flexible diaphragm with the double seated valve; a passage connecting one part of the said closed space with the auxiliary reservoir; a passage connecting the other part of the closed space with the supply pipe; a spring acting against the flexible diaphragm and augmenting the force upon the diaphragm due to the supply pipe pressure, the said augmented force holding the double seated check valve in its normal position, in which communication between the auxiliary reservoir and the auxiliary passage is closed, and communication between the control pipe and the operating cylinder is open; means for offering a resistance to the motion of the operating piston for a part of its stroke, the said resistance reacting against the effect of the control pipe pressure; means establishing communication between the brake cylinder and the supply pipe; two check valves controlling the said communication between the brake cylinder and the supply pipe, one of which prevents pressure flowing from supply pipe into brake cylinder, the other prevents the flow of pressure from brake cylinder into the supply pipe; a piston coacting with the first named check valve and movable in a cylinder one end of which communicates with the brake cylinder, the other end communicating by a passage with the auxiliary reservoir, the communication between the auxiliary reservoir and the said passage being controlled by the slide valve substantially as, and for the purpose specified; a small passage connecting the two ends of the operating cylinder substantially as, and for the purpose specified; and a manually operated valve for closing communication between the supply pipe and the auxiliary reservoir; closing communication between the brake cylinder and one end of the operating cylinder also opening communication between the same end of the operating cylinder and the supply pipe; closing communication between the control pipe and the other end of the operating cylinder and also opening communication between the same end of the operating cylinder and the auxiliary reservoir.

43. A valve comprising means for communicating with an auxiliary reservoir; a passage connecting the auxiliary reservoir with a supply pipe; devices permitting a small gradual return of pressure from the auxiliary reservoir to the supply pipe, the said devices closing communication between the auxiliary reservoir and the supply pipe upon a rapid reduction of pressure in the supply pipe; a passage connecting the auxiliary reservoir with a brake cylinder; a slide-valve controlling communication between the said passage and the auxiliary reservoir, also controlling communication between the said passage and an exhaust port; an auxiliary device contained in the slide valve controlling communication between the auxiliary reservoir and brake cylinder; means substantially as and for the purpose specified connecting the slide valve and its auxiliary device, with a movable piston operating in a closed cylinder; a passage connecting one end of the said operating cylinder with the brake cylinder; a passage connecting the other end of the operating cylinder with a control pipe; an auxiliary passage connecting the last named passage with the auxiliary reservoir; a double seated check valve controlling communication between the control pipe and the operating cylinder, also controlling communication between the auxiliary reservoir and the said auxiliary passage; a closed space divided into two parts by a flexible diaphragm; means connecting the flexible diaphragm with the double seated valve; a passage connecting one part of the said closed space with the auxiliary reservoir; a passage connecting the other part of the closed space with the supply pipe; a spring acting against the flexible diaphragm and augmenting the force upon the diaphragm due to the supply pipe pressure, the said augmented force holding the double seated check valve in its normal position, in which communication between the auxiliary reservoir and the auxiliary passage is closed, and communication between the control pipe and the operating cylinder is open; and means for offering a resistance to the motion of the operating piston for a part of its stroke, the said resistance reacting against the effect of the control pipe pressure.

44. A valve comprising means for communicating with an auxiliary reservoir; a passage connecting the auxiliary reservoir with a supply pipe; devices permitting a small gradual return of pressure from the auxiliary reservoir to the supply pipe, the said devices closing communication between the auxiliary reservoir and the supply pipe upon a rapid reduction of pressure in the supply pipe; a passage connecting the auxiliary reservoir with a brake cylinder; a slide valve controlling communication between the said passage and the auxiliary reservoir, also controlling communication between the said passage and an exhaust port; an auxiliary device contained in the slide valve controlling communication between the auxiliary reservoir and brake cylinder; means substantially as and for the purpose specified connecting the slide valve and its auxiliary device with a movable piston operating in a closed cylinder; a passage connecting one end of the said operating cylinder with the brake cylinder; a passage connecting the other end of the operating cylinder with a control pipe; an auxiliary passage connecting the last named passage with the auxiliary reservoir; a double seated check valve controlling communication between the control pipe and the operating cylinder, also controlling communication between the auxiliary reservoir and the said auxiliary passage; a closed space divided into two parts by a flexible diaphragm; means connecting the flexible diaphragm with the double seated valve; a passage connecting one part of the said closed space with the auxiliary reservoir; a passage connecting the other part of the closed space with the supply pipe; a spring acting against the flexible diaphragm and augmenting the force upon the diaphragm due to the supply pipe pressure, the said augmented force holding the double seated check valve in its normal position, in which communication between the auxiliary reservoir and the auxiliary passage is closed and communication between the control pipe and the operating cylinder is open; means for offering a resistance to the motion of the operating piston for a part of its stroke, the said resistance reacting against the effect of the control pipe pressure; a small passage connecting the two ends of the operating cylinder substantially as and for the purpose specified; and a manually operated valve for closing communication between the supply pipe and the auxiliary reservoir; closing communication between the brake cylinder and one end of the operating cylinder also opening communication between the same end of the operating cylinder and the supply pipe; closing communication between the control pipe and the other end of the operating cylinder and also opening communication between the same end of the operating cylinder and the auxiliary reservoir.

ARTHUR IRVING PERRY.

Witnesses:
HOLTON DUNCAN ROBINSON,
ROBERT EDWARD HAWLEY.